United States Patent [19]

Hugley

[11] 4,303,102

[45] Dec. 1, 1981

[54] HOSE ENDING AND METHOD OF FORMING SAME

[76] Inventor: Dale G. Hugley, Box 465, Kennedale, Tex. 76060

[21] Appl. No.: 130,815

[22] Filed: Mar. 17, 1980

[51] Int. Cl.³ .................... B65D 59/02; B65D 59/06
[52] U.S. Cl. ................................. 138/96 R; 138/89
[58] Field of Search ................... 138/96 R, 89, 96 T

[56] References Cited

U.S. PATENT DOCUMENTS

| | | | |
|---|---|---|---|
| 2,022,189 | 11/1935 | Engstrom | 138/96 T |
| 2,125,552 | 8/1938 | Feldhoff | 138/89 |
| 2,156,221 | 4/1939 | Kahn et al. | 138/96 T |
| 2,737,205 | 3/1956 | Stringfield | 138/96 R |
| 3,661,184 | 5/1972 | Lachenmayer | 138/89 |
| 3,713,463 | 1/1973 | Bywater, Jr. | 138/96 T |
| 4,079,756 | 3/1978 | Smiley | 138/96 T |

Primary Examiner—Willis Little
Attorney, Agent, or Firm—Thomas L. Cantrell; Joseph H. Schley; Stanley R. Moore

[57] ABSTRACT

Disclosed is an improved hose ending and method of forming same in which uncured hose is fitted over an end piece having a metal collar therearound. A multi-segment collar is then clamped over the uncured hose, and an overlying metal collar is slipped over the segmented collar as the temporary clamp is removed. Additional uncured hose material is wrapped over the overlying metal collar, and the assembly is placed in a mold and cured.

6 Claims, 9 Drawing Figures

HOSE ENDING AND METHOD OF FORMING SAME

BACKGROUND OF THE INVENTION

In many applications it is necessary to form a secure joint between a length of high pressure elastomer hose and end piece of some sort. The joint should be substantially as strong from a pressure resistance standpoint as the balance of the hose. In addition, it should be reasonably simple to construct.

Many types of joints have been proposed and/or used in the past to meet these requirements, but the inherent difficulties of securing a hose to an end piece have not been fully overcome by such prior approaches.

SUMMARY OF THE INVENTION

In accordance with the invention, an improved hose ending and method for forming same is provided in which the joint between the end piece and the hose is constructed while the hose is in uncured condition, and is completed by curing the hose and the joint simultaneously. In its preferred form, the metal components of the joint are fully embedded in elastomer and are thus protected from corrosion. The hose ending, as explained below, employs several metal collars. In forming the joint, these are coated with vulcanizing agent so that they will be securely bonded to the material of the hose when it is cured.

The hose ending of the invention is constructed by first placing a metal collar or hoop around the cylindrical end piece which is to be joined to the hose. The hose, in uncured form (i.e. prior to vulcanizing), is then pulled over the end piece and its collar. Next, a multi-segment collar is placed over the uncured hose, with the segments arranged end-to-end so that they extend completely around the outer circumference of the uncured hose. The multi-segment collar is clamped tightly in place on the hose with a temporary clamp. Next, an outer collar or hoop is slid over the multi-segment collar, while the temporary clamp is simultaneously withdrawn. The outer collar is sized to hold the multi-segmented collar tightly in place.

In its preferred form, the invention contemplates that one or more layers of uncured hose material are then wrapped around the outer collar, so that the collars, when the joint is cured, will be fully covered by, and embedded in elastomer, and thus protected against corrosion and abrasion.

The assembly as thus far described is placed in a heated mold to cure the hose and securely bond it to the metal collars, thus completing the joint.

From the foregoing, it can be seen that a principal object of the present invention is the provision of an improved hose ending which is strong, secure, and easy to construct.

The manner in which this object, together with other objects and purposes of the invention are attained may best be understood by a consideration of the detailed description which follows, together with the accompanying drawings.

DESCRIPTION OF THE PREFERRED EMBODIMENTS

Figure 1:
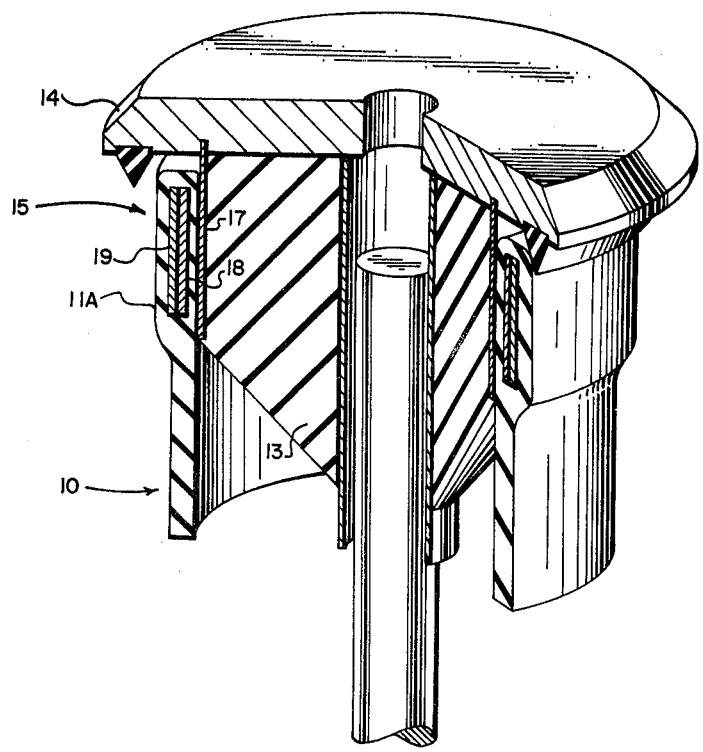
FIG. 1 is a cut-away perspective view, with portions broken out, of a pulse stabilizer cartridge, constructed from elastomeric hose and incorporating two hose endings of the invention.
Figure 1:
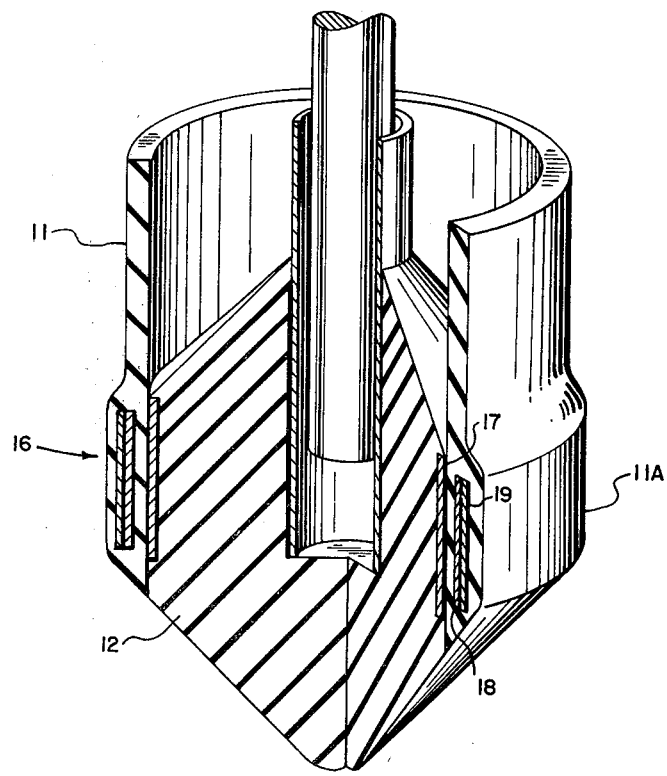

FIG. 1 shows the invention as applied in a pulse stabilizer cartridge of the kind employed in the invention described and claimed in my co-pending U.S. patent application, Ser. No. 017,046, filed Mar. 2, 1979, and entitled "Surge Stabilizer." Although the hose ending of the invention is here illustrated in the environment of a pulse stabilizer cartridge, those with skill in the art will appreciate that it may be applied in many other situations where a strong hose ending construction is called for.

In FIG. 1, the pulse stabilizer cartridge is designated generally as 10. It comprises a length of elastomeric hose 11, into the ends of which are secured end caps 12, 13. End cap 13 is attached to an end plate 14. The cartridge structure just recited is that which is germane to a discussion of the present invention, and reference is made to my above mentioned application for a discussion of the details of the remaining cartridge structure.

End pieces 12 and 13 are preferably formed of hard rubber, although they may be constructed of other materials. Over at least part of their lengths, they are cylindrical in shape, and of a diameter sized to fit into hose 10.

Two hose endings of the invention are shown in FIG. 1, and are designated generally as 15, 16. Hose ending 15 comprises an inner collar 17, which fits tightly over, and is bonded to, end piece 13. Hose 11 fits tightly over, and is bonded to inner collar 17. Multi-segment collar 18 fits over hose 11 outwardly of collar 17. Tightly overlying it is outer collar 19. Outer collar 19 is surrounded by a thickened portion of the hose, designated 11A. Both collars 18 and 19 are bonded to the elastomer of hose 11.

Hose ending 16 is constructed in the same manner as hose ending 15, and its parts are designated with the same reference characters.

It is preferred, as shown in FIG. 1, that collars 18 and 19 be embedded in thickened hose portion 11A, since this protects them from corrosion and abrasive wear, but they may be left exposed if desired.

Figure 2:
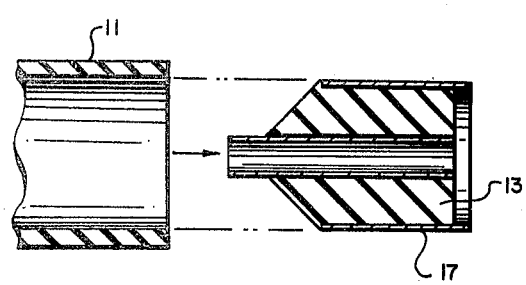
FIGS. 2 through 4 and 6 through 9 are a series of somewhat diagrammatic sectional side elevational views of a hose ending in the course of construction, showing in sequence the steps of the method of the invention.
Figure 3:
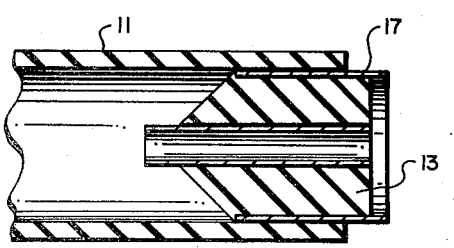

Attention is now directed to FIGS. 2 through 9, from which an understanding of the method aspects of the invention may be obtained. In FIG. 2, end piece 13, with inner collar 17 in place on it, is shown aligned with uncured hose 11, at the start of the process. The uncured hose is drawn over end piece 13 until it at least partially covers collar 17, as is shown in FIG. 3.

Figure 4:
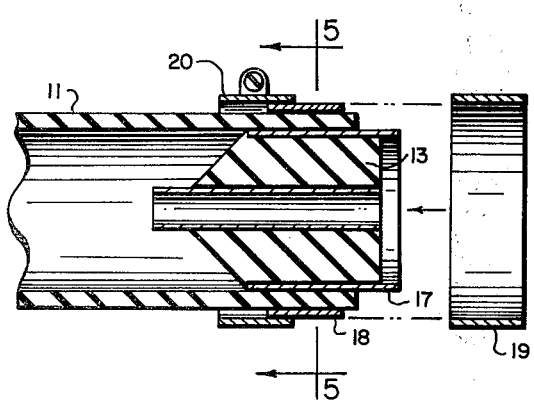
Figure 5:
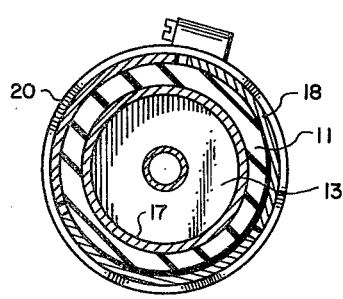
FIG. 5 is a cross sectional view taken on the line 5—5 of FIG. 4.

Next, as can be seen by considering FIGS. 4 and 5 together, multi-segment collar 18 is placed over uncured hose 11 in position to overlie collar 17, and is drawn firmly down onto the hose by temporary clamp 20. As can be seen in FIG. 5, collar 18 is preferably formed in three segments, although different numbers may be employed. The clamp 20 is positioned so that it does not entirely cover collar 18. FIG. 4 illustrates outer collar 19 aligned with end piece 13, ready for placement over collar 18.

Figure 6:
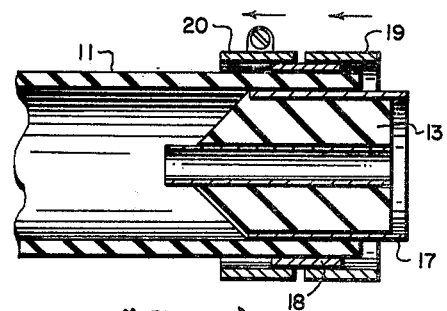
Figure 7:
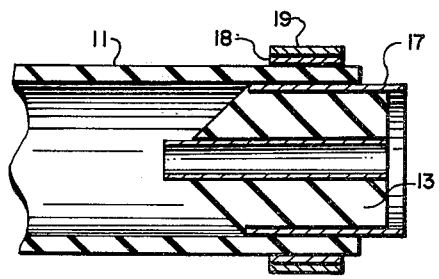

The installation of outer collar 19 is shown in FIGS. 6 and 7, from which it can be seen that temporary clamp 20 is progressively withdrawn from segmented collar 18 as outer collar 19 is slipped over it.

Figure 8:
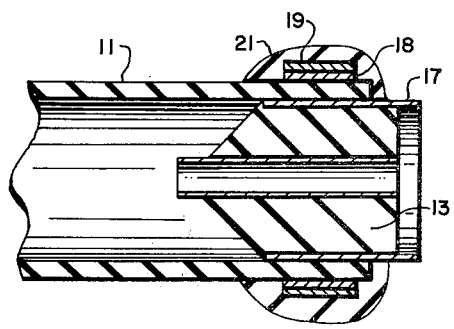
Figure 9:
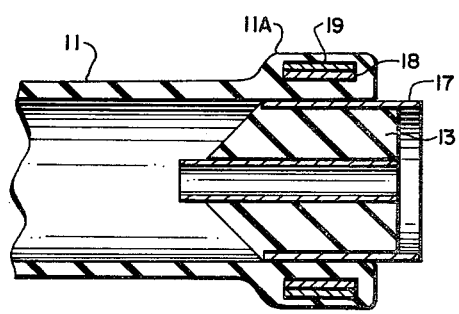

If desired, the assembly as shown in FIG. 7 may be placed in a mold and cured. However, it is preferred, as shown in FIGS. 8 and 9, to wrap an additional layer of uncured elastomer 21 over collar 19. The assembly as shown in FIG. 8 is then placed in a heated mold and cured to form the finished product illustrated in FIG. 9. The curing step effectively incorporates layer 21 into hose 11, as a thickened region thereof designated 11A.

I claim:

1. An improved hose ending comprising:
    a generally cylindrical hose having an end;
    an end piece for said hose, having a cylindrical wall extending over at least a portion of its length;
    an inner metallic unitary collar fitted onto the cylindrical portion of said end piece;
    said end piece and inner collar being fitted into said hose end;
    a multi-segment collar fitted over said hose end in position to overlie said end piece and inner collar; and
    an outer collar fitted over said multi-segment collar to urge it against said hose.

2. A hose ending in accordance with claim 1 in which said multi-segment collar is formed in three segments.

3. A hose ending in accordance with claims 1 or 2 and further comprising a portion of said hose overlying said multi-segment collar and said outer collar and bonded thereto.

4. A hose ending in accordance with claims 1, 2 or 3 in which said hose is bonded to said inner collar.

5. A method of forming an improved hose ending comprising:
    fitting an inner metallic collar over a generally cylindrical end piece;
    fitting said end piece with said inner collar thereon into the end of an uncured hose;
    clamping a multi-segment collar on said uncured hose in position to overlie said inner collar;
    sliding an outer collar over said multi-segment collar while simultaneously unclamping it; and
    curing said uncured hose to bond it to said inner collar and said multi-segment collar.

6. A method in accordance with claim 5 and further comprising overlying said outer collar with uncured elastomer prior to curing said uncured hose, whereby upon completion of the curing step said multi-segment collar and outer collar are covered by and bonded to said elastomer.

* * * * *